W. EVANS,

Assignor, by mesne assignments, to L. T. MATLOCK, G. E. EVANS & S. A. KENSIL.

Machine for Forging Spring Plates.

No. 9,650. Reissued April 12, 1881.

Witnesses:-
Jno. R. Haynes
Ed Blatzmayer

Inventor:-
William Evans
by his Attorneys
Brown & Brown

N. PETERS, PHOTO-LITHOGRAPHER, WASHINGTON, D. C.

UNITED STATES PATENT OFFICE.

WILLIAM EVANS, OF PHILADELPHIA, PENNSYLVANIA, ASSIGNOR, BY MESNE ASSIGNMENTS, TO LEWIS T. MATLOCK, GEORGE E. EVANS, AND SAMUEL A. KENSIL, OF SAME PLACE.

MACHINE FOR FORGING SPRING-PLATES.

SPECIFICATION forming part of Reissued Letters Patent No. 9,650, dated April 12, 1881.

Original No. 147,919, dated February 24, 1874. Application for reissue filed February 10, 1881.

*To all whom it may concern:*

Be it known that I, WILLIAM EVANS, of Philadelphia, Pennsylvania, have invented a Machine for Forging Spring Leaves or Plates, of which the following is a specification.

The object of my invention is to forge the leaves or plates of that class of springs in which a longitudinal rib on one leaf is adapted to a corresponding groove on an adjoining leaf, so that when fitted together the several leaves shall be maintained in their proper lateral positions.

My improvements comprise dies, one of which has its face provided with a rib for forming a groove in a spring leaf or plate, the other of which has its face provided with a corresponding groove for forming a rib on the opposite side of the spring leaf or plate, the faces of the dies being arranged at an angle to each other to produce a taper form to the spring leaf or plate, and means for reciprocating one of the dies to bring its face forcibly into proximity with the other die to operate on the spring leaf or plate.

The improvements also comprise the use of jaws for adjusting and retaining the spring leaves or plates in proper relation to the dies, and for straightening their edges, if necessary.

Figure 1:
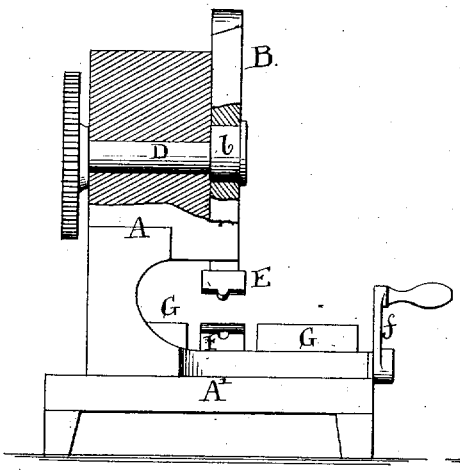
Figure 2:
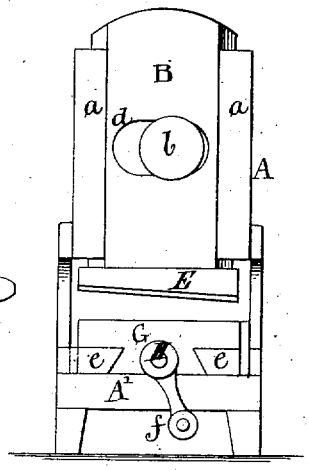
Figure 3:
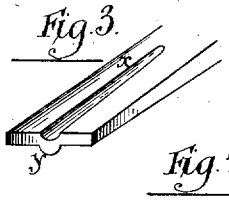
Figure 4:
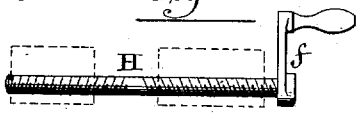

In the accompanying drawings, Figure 1 is a sectional side view of a machine embodying my improvements. Fig. 2 is a front view of the same. Fig. 3 is a perspective view of the end portion of a spring leaf or plate having a groove in one side and a rib on the other side; and Fig. 4 is a transverse section, illustrating the straightening and adjusting jaws in dotted outline, and the screw for operating them.

A is the frame of the machine, in front of which are guides *a a* for the slide B, which has a vertical reciprocating motion imparted to it by a crank-pin or eccentric, *b*, on the driving-shaft D, the said crank-pin being adapted to a transversely-elongated slot, *d*, in the slide. To the lower end of this slide is secured the upper die, E, and to the base A′ of the frame is secured the lower die, F, on each side of which is a jaw, G, adapted to guides *e e* on the base A′, the two jaws being controlled by a screw-shaft, H, having a right-handed thread adapted to a nut in one jaw and a left-handed thread adapted to a nut in the other jaw, as shown in the vertical section, Fig. 4, so that the jaws must move simultaneously from or toward each other, according to the direction in which the handle *f* on the screw-shaft is turned. The upper die, E, is inclined, as shown in Fig. 2, in accordance with the taper to be imparted to the leaf or plate, Fig. 3, of the spring, and on the inclined face of this die is a rib for forming the depression *x* in the leaf or plate; the lower die having its face provided with a groove for the formation of the rib *y*.

When the slide B and its die E are in an elevated position, and the jaws G G are open, as shown in Fig. 1, the bar of iron or steel to be converted into the leaf or plate of a spring is, while in a red-hot state, placed on the die F, and the jaws are then closed on the bar, so as to insure the straightness of the opposite edges, after which the slide B, with its die, descends, and, in conjunction with the die F, imparts the desired shape (Fig. 3) to the leaf, and forms the groove *x* in, and the rib *y* on, the same.

The jaws G G may perform the twofold duty of straightening the bar laterally and of adjusting it to the proper position for insuring the formation of the groove and rib in the proper position on the said bar.

It will be seen that by my invention I produce a machine wherein are two dies, one having its face provided with a rib and the other having its face provided with a corresponding groove, and having their faces arranged at an angle relatively to each other; and it will also be seen that combined with said dies are means for reciprocating the movable die to bring its face forcibly into proximity with the face of the fixed die to form the leaf or plate of a spring with a groove in one side and a rib on the other side.

I claim as my invention—

1. In a machine for forging spring leaves or plates, the combination of a movable die and a fixed die, one having a rib and the other a corresponding groove, the two having their faces arranged at an angle relatively to each other, and means for reciprocating the movable die to bring its face forcibly into proximity with the face of the fixed die, substantially as and for the purpose specified.

2. The combination of the movable inclined die E and its rib with the fixed die F and its groove.

3. The combination of the dies E and F with the straightening and retaining jaws G G.

WILLIAM EVANS.

Witnesses:
J. R. MASSEY,
ELI DILLIN.